United States Patent
Byers et al.

(10) Patent No.: US 7,912,827 B2
(45) Date of Patent: Mar. 22, 2011

(54) SYSTEM AND METHOD FOR SEARCHING TEXT-BASED MEDIA CONTENT

(75) Inventors: Simon D. Byers, Summit, NJ (US);
David Kormann, Morristown, NJ (US);
Allan Wilks, Scotch Plains, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 276 days.

(21) Appl. No.: 11/213,457

(22) Filed: Aug. 26, 2005

(65) Prior Publication Data
US 2006/0122984 A1    Jun. 8, 2006

Related U.S. Application Data

(60) Provisional application No. 60/632,467, filed on Dec. 2, 2004.

(51) Int. Cl.
*G06F 7/00* (2006.01)
*G06F 17/30* (2006.01)

(52) U.S. Cl. ........................................ 707/706
(58) Field of Classification Search .................. 707/706, 707/999.003
See application file for complete search history.

(56) References Cited

U.S. PATENT DOCUMENTS

| | | | |
|---|---|---|---|
| 5,481,296 A | 1/1996 | Cragun et al. |
| 5,659,742 A | 8/1997 | Beattie et al. |
| 5,703,655 A | 12/1997 | Corey et al. |
| 5,786,814 A | 7/1998 | Moran et al. |
| 5,794,249 A | 8/1998 | Orsolini et al. |
| 5,835,667 A | 11/1998 | Wactlar et al. |
| 6,104,861 A | 8/2000 | Tsukagoshi |
| 6,262,775 B1 | 7/2001 | Kim |
| 6,360,234 B2 | 3/2002 | Jain et al. |
| 6,430,357 B1 | 8/2002 | Orr |
| 6,463,444 B1 | 10/2002 | Jain et al. |

(Continued)

FOREIGN PATENT DOCUMENTS

EP    0 903 676 A2    3/1999

(Continued)

OTHER PUBLICATIONS

Google Print, About Google Print (Beta) (http://web.archive.org/web/20041012082109/http://print.google.com/), Oct. 12, 2004, 1-7.*

(Continued)

*Primary Examiner* — Jean B. Fleurantin
*Assistant Examiner* — Aleksandr Kerzhner (57) ABSTRACT

Disclosed is a system, method and computer-readable medium related to searching at least one text-based media presentation. Examples of such media include, but are not limited to, print media such as books, magazines, and newspapers. The method comprises receiving a query associated with words in a text-based media presentation and in response to the query, searching within a database organized as a plurality of content-based indexed segments associated with at least one text-based media presentation, each indexed segment further comprising text and a still image corresponding to an associated portion of the text-based media presentation. The method retrieves a plurality of indexed segments as a result of the search wherein the user may navigate forward to at least one following indexed segment and backward to at least one previous indexed segment from an indexed segment associated with the query. Media presentations organized, searched and navigated by this approach may also include movies, video and audio presentations.

20 Claims, 8 Drawing Sheets

U.S. PATENT DOCUMENTS

| | | |
|---|---|---|
| 6,567,980 B1 | 5/2003 | Jain et al. |
| 6,580,437 B1 | 6/2003 | Liou et al. |
| 6,636,238 B1 | 10/2003 | Amir et al. |
| 6,697,796 B2 | 2/2004 | Kermani |
| 6,782,380 B1 | 8/2004 | Thede |
| 6,901,207 B1 | 5/2005 | Watkins |
| 6,922,691 B2 | 7/2005 | Flank |
| 2002/0170062 A1 | 11/2002 | Chen et al. |
| 2003/0013073 A1* | 1/2003 | Duncan et al. ............... 434/317 |
| 2004/0122811 A1* | 6/2004 | Page ............................. 707/3 |
| 2004/0263621 A1 | 12/2004 | Guo et al. |
| 2005/0022252 A1 | 1/2005 | Shen |
| 2005/0097080 A1 | 5/2005 | KethiReddy et al. |
| 2005/0117884 A1 | 6/2005 | Kang et al. |
| 2005/0198006 A1 | 9/2005 | Boicey et al. |

FOREIGN PATENT DOCUMENTS

EP  1 043 655 A2  10/2000

OTHER PUBLICATIONS

"A9, 7 Reasons to Use A9.com" (http://web.archive.org/web/20040417170253/http://a9.com/), Apr. 17, 2004, 1-3.*

Technology Briefing, "Technology Briefing | Internet: Google Begins Book-Excerpt Technology" (http://query.nytimes.com/gst/fullpage.html?res=9C05E2D9173BF934A35753C1A9629C8B63&fta=y), Oct. 7, 2004, 1-2.*

Price, "Amazon Debuts New Book Search Tool" (http://searchenginewatch.com/showPage.html?page=3098831), Oct. 27, 2003, 1-2.*

"Virage Introduces Media Management System-Breakthrough Video Cataloging and Media Asset Management Solution", Gale Group Trade & Industry DB (c) 2005 The Gale Group, 09727260 Supplier No. 19752608, 3 pages, *Business Wire*, p. 9150135, Sep. 15, 1997.

Gauvain, et al. "Transcribing broadcast news for audio and video indexing", Communications of the ACM, vol. 43, No. 2, pp. 64-70, Feb. 2000, seven pages.

Perey, Christine, "A card catalog for your multimedia; Repurpose your video assets to save money or make new revenue", Network World, p. 71, Sep. 10, 2001, four pages.

Gustavson, Ron, "Sorting Through Digital Asset Management"(Industry Overview, *Tape-Disc Business*, vol. 15, No. 9, p. 22, Sep. 2001, three pages.

Yoshida, Junko "MPEG-7 vote to trigger hunt for killer apps", (Technology Information), *Electronic Engineering Times*, p. 1, Aug. 13, 2001, three pages.

Gilmer, Brad, "Media asset management", *Broadcast Engineering*, vol. 44, No. 7, p. 34, Jul. 2002, 3 pages.

Fuller, Chuck, "Virage Developer Program Overview", Developer Relations, Virage. Mar. 2002; nine pages.

Datasheet "VideoLogger Automate Video Encoding and Indexing", Virage, 2003.

Foote, J. "An Overview of Audio Information Retreival" Multimedia Systems, ACM, New York, NY, US, vol. 7, No. 1, Jan. 1999, pp. 2-10, XP002221393 ISSN:0942-4962 p. 7, line 22—p. 8, line 4; figures 3.

MPEG-1, "MPEG-1 Video Codec" (http://web.archive.org/web/20030224224851/http://www.emlab.csie.ntu.edu.tw/eml/dsp/training/coding/mpeg/1), Feb. 24, 2003, 1-11.

* cited by examiner

SYSTEM AND METHOD FOR SEARCHING TEXT-BASED MEDIA CONTENT

PRIORITY CLAIM AND RELATED APPLICATION

The present application claims priority to U.S. Provisional Application No. 60/632,467 filed Dec. 2, 2004, the contents of which are incorporated herein by reference in its entirety. The present application is related to U.S. patent application Ser. No. 11/213,579, filed Aug. 26, 2005, the contents of which is incorporated hereinby reference in its entirety.

BACKGROUND OF THE INVENTION

1. Field of the Invention

The present invention relates to media content and more specifically to a system and method for indexing, searching within, retrieving and navigating media content and text such as books, newspapers, and magazine.

2. Introduction

Those who frequently use the Internet are familiar with search engines such as Google® and Yahoo®. Search engines have proven highly useful in taking a text query from a user and searching within web pages to retrieve related information containing the queried text. The nature of web pages allows their text content to be easily searched. While this is valuable, it is also limiting, because it excludes a host of media from being searched. The content of media presentations such as motion pictures, songs, and printed publications are not searchable in their original form.

As the body of motion pictures, songs, books, and other works expands, so does the body of well-known lines and phrases from these works. Lines like, "I am your father," or "a three-hour tour," or "It was the best of times, it was the worst of times," are recognized almost universally as lines from the films, songs, or books that made them famous. They are often quoted and imitated in other media presentations, becoming incorporated into popular idioms and expressions. Many people may remember a movie or a song by such a phrase where they may forget the movie's tide or the actors in the movie.

The origins of these phrases and their impact on language and society are topics of scholarly study. Famous lines end up changing the way a culture may communicate. The popularity of these phrases may also be utilized as a marketing tool. Often, the lasting memory of a movie, song, or book is encapsulated by just a few words in the minds of its audience.

Many media presentations are viewed, heard, read, rented, bought and sold worldwide in a great variety of formats. One highly popular format is the digital video disk (DVD). Sales of DVDs have become very popular and in some cases revenues from DVD sales outpace revenues from movie theater ticket sales. Growth and development in several areas—especially the internet—are bringing an ever wider variety of options, titles, and sources of media content to consumers. Also, a proliferation of illicit sources and media distribution methods poses a challenge to the legal owners of copyrighted works. It is desirable for content providers and copyright owners to allow consumers to search for, discover, and learn about the available media. There are numerous media presentations which are not demanded by consumers simply because consumers are not aware that they exist.

Many consumers may desire to buy a particular movie but cannot remember the tide or main actors. The same problem may occur in trying to find a particular song, but remembering only a few words or phrases from the lyrics. Furthermore, those doing media research may desire to draw comparisons between the content of several different presentations. Without searchable access and retrieval capabilities, the difficulty of each of these tasks is increased.

Amazon.com® provides one example of how users may identify through a tide or author search media content and be able to purchase the content. For example, one Amazon.com feature enables the user to search via book tide and then view a page and move forward or backward a few pages in the book. This information helps the user determine whether to purchase the book. Selected pages are shown such as the index, table of contents, and an excerpt from a few pages within the book. There are limitations to this approach in that unless the user knows the title or author, it can be difficult to locate or identify the book. A user may only know a few phrases from the book or movie. In Amazon.com, where a user is enabled to search the contents of a book, the user can select a book and then insert a search term and receive a listing of pages that contain the search term. The user then may select a page and browse the immediate following or previous pages to get a context of the book. There is no intelligent searching or navigation of the book contents other than a simple word search.

Other search engines are similar. For example, Google's® search engine does not include the content of media but will return web pages that contain the search terms. Therefore, a user seeking to identify media that contains certain words or phrases cannot identify the media via a Google search. Further, intelligent searching forward or backward within a Google result is not possible.

Legal issues exist in the realm of searching content. When Google returns a listing of web pages, the search engine only reports several words from the particular web page. When a user "clicks" on that listing, the user's web browser is pointed to the originating web page and thus is sent to the content owner's webpage. The use of the few words to describe the webpage as a result of a Google search does not implicate copyright infringement. In the context of obtaining searchable media such as movies, songs or printed media, the ability to redirect users to the source of the content for viewing the actual content becomes problematic in terms of copyright protection. Unlike web-pages that are freely available, not all copyright owners place songs, books or other printed media or movies on the Internet for free viewing and linking.

What is needed in the art is a new method for enabling the searching of media content and specifically searching for words and phrases within media content while maintaining the rights of copyright owners and enabling more intelligent navigation of the media.

SUMMARY OF THE INVENTION

Additional features and benefits of the invention will be set forth in the description which follows, and in part will be obvious from the description, or may be learned by practice of the invention. The features and advantages of the invention may be realized and obtained by means of the instruments and combinations particularly delineated in the appended claims. These and other features of the present invention will become more fully apparent from the following description and appended claims, or may be learned by the practice of the invention as set forth herein.

The present invention addresses the deficiencies in the prior art. The present invention enables a user to search media presentations such as, for example, books, songs and video material such as movies based on the content of the presentation. As an example, a user may search for media that includes the phrase "I am your father". In response to the search according to the present invention, the search engine would return a listing of media that include the words or phrase. Therefore, users who may desire to identify movies or books where a certain phrase is spoken or written or presented in some fashion can retrieve the desired information when the media content is processed and indexed as described herein. Previously, books and movies were searchable only by title, author, or some other manner other than by content. This is especially true of movies and video content.

In recent years, the widespread application of text-based indexing and searching has revolutionized the way in which electronic information is stored, retrieved, and presented. The introduction of search capabilities provides both reference and sales opportunities, as demonstrated by the proliferation of web-based searching and shopping agents. In their respective roles, these tools are highly effective, but they do not sufficiently support the retrieval of content from within media presentations.

The present invention provides a detailed index through which the content of a media presentation or many media presentations may be retrieved and navigated according to the indexed segments rather than linearly forward or backward from a located spot in the media. This retrieval facilitates the display, reference, and analysis of such content—providing an improved research tool and improved commercial and service applications to consumers. The media content may be video but may also be books, newspapers, magazines, or any other text-based media.

The invention provides for a system, method, and computer readable medium storing instructions related to the indexing, searching, retrieving and enabling a user to navigate through media content. The method embodiment comprises receiving a query associated with words in a media presentation. In response to the query, the method comprises searching within a database of at least one media presentation index organized as a plurality of content-based indexed segments, each indexed segment comprising text and a still image corresponding to a portion of the original presentation and retrieving at least one indexed segment as a result of the search. Once the retrieved segment is provided to the user, the user may search forward or backward through the media in a more intelligent manner in that the segments are indexed. In other words, once a frame is presented or a page from a book is presented that relates to a search query, the skipping forward and backward is done via the indexed segments rather than unintelligently just to the previous or next page or to the next frame. The indexed segments may be organized in any fashion such as according to the next person speaking, next conversation, next scene, next car chase, next gunshot, next song sung by singer A, etc.

Additional features of the invention include the presentation of the retrieved results from the search. In the context of a movie or video presentation, the indexed segment comprises a word, phrase or sentence from a movie scene and a still image from that scene. Other information and searching are capable as the indexed segment is presented to the user. Therefore, utilizing the features of the invention, a user can search using the string "I am your father" and receive as listing of videos, movies, books or any combination of media that utilize the phrase and select the movie Star Wars from the listing to view a still image of Darth Vader with the text or subtitles from that scene.

The capabilities associated with the invention enable a number of analysis tools for searching within video content. For example, there is a verbosity histogram that presents a user with a context of the retrieved segment with regards to how many words are in the dialog before and after the retrieved segment. Other analysis tools, such as for marketing analysis, are also presented for each video presentation.

BRIEF DECRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
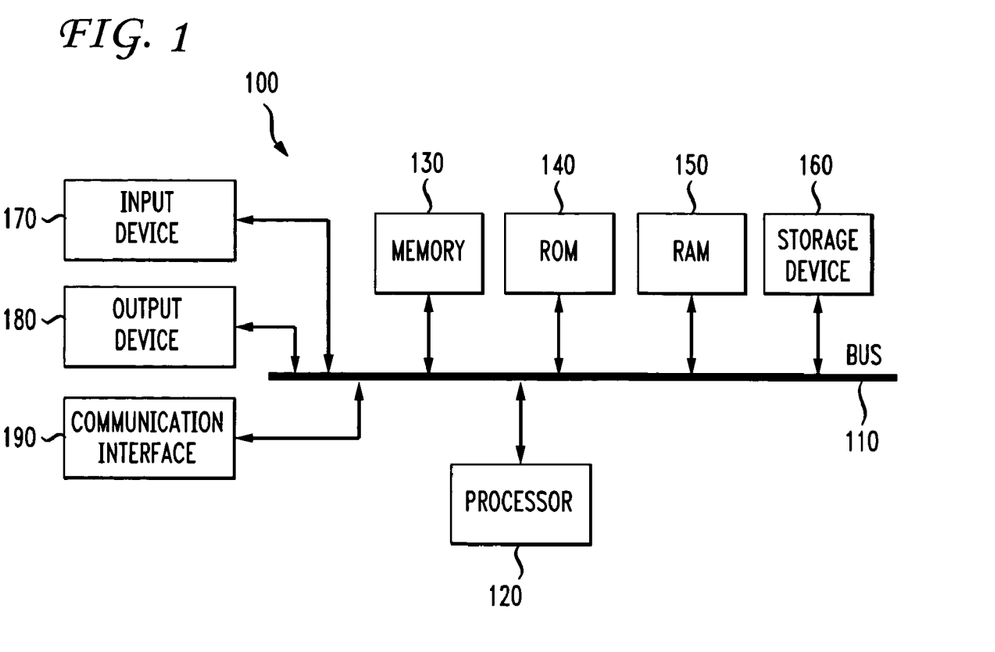
FIG. 1 illustrates an exemplary compute device.
Figure 2:
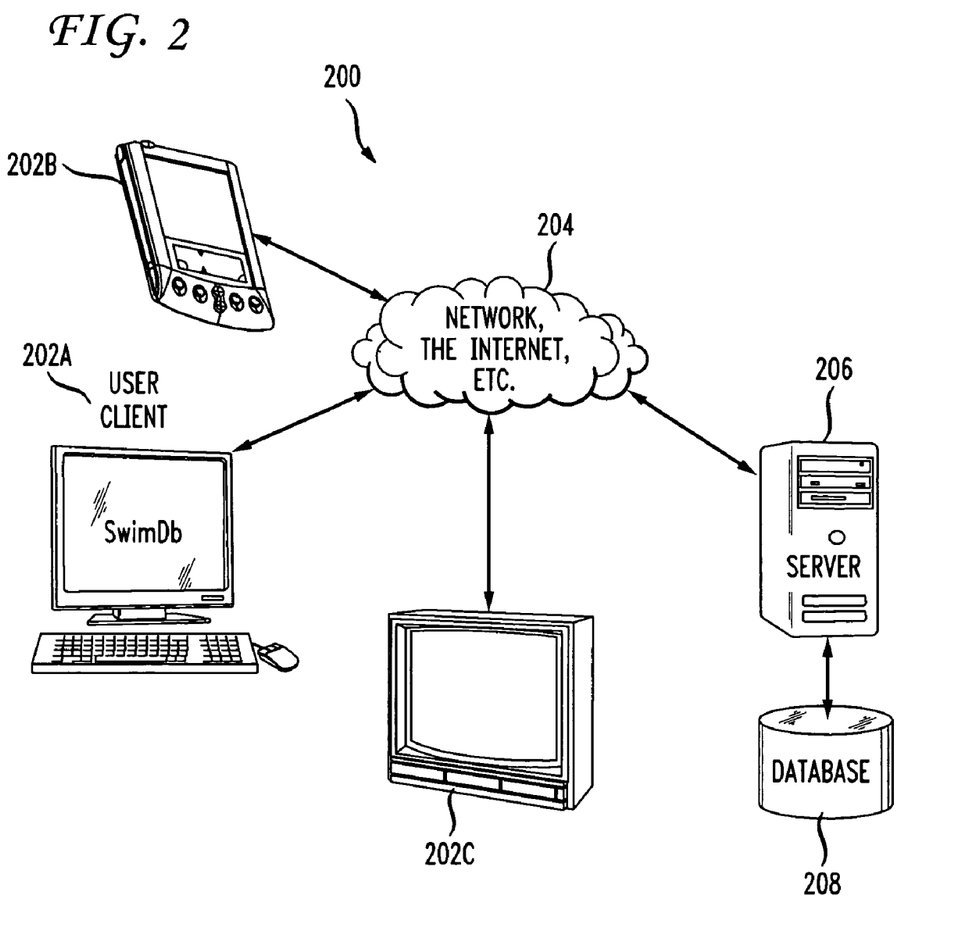
FIG. 2 illustrates an exemplary network computing environment.

The present invention may be practiced in embodiments of a system, a method, and a computer readable medium for indexing and searching within subtitled media. A system according to the invention may comprise known hardware components such system 100 illustrated in FIG. 1. Exemplary system 100 may include elements such as a bus 110, processor 120, memory 130, read-only memory (ROM) 140, random-access memory (RAM) 150, storage device 160, input device 170, output device 180, and communication interface 190. Those of skill in the art will recognize in system 100 the components typical of personal computers, computer server, handheld compute devices, or other such compute devices. Such a compute device may communicate with a client device over a network such as the Internet as illustrated in FIG. 2 or may be a stand-alone device. There is no restriction on the type of hardware that may be used to create the system.

An illustration of a network compute environment in which the invention may be utilized is given in FIG. 2. This figure illustrates a system 200 having client user devices such as a personal computer (PC) 202*a*, a portable computing device 202*b*, or a television entertainment center 202*c*. These devices connect via a network (such as the Internet, wireless network, intranet or other type of network) 204, with a server 206 and a database 208. In system 200, the database 208 is configured to be accessed simultaneously by multiple users via the server 206. However, in the case that only one user needs access to the database at a time, the database need not be stored on a remote compute device, but could in principle be stored locally in the memory and storage system of a single compute device such as that illustrated in FIG. 1.

As introduced above, the invention enables a user to search media content of any type via a search of text within the content. The search is typically a text search but may also be received multimodally such as through speech and graffiti. To further illustrate the Star Wars (Episode V, The Empire Strikes Back) example above, a computing device may receive a query for the phrase "I am your father." The invention searches a database organized as described below and returns the various movies that include this phrase, such as The Empire Strikes Back, Toy Story II, and Spaceballs. The results of the search are initially preferably displayed as a listing of media that contains the words or phrase from which the user can select which media to view further. The listing may include multiple types of media such as books and movies that contain the phrase. For example, many books are made into movies and such a presentation of both the book and the movie can enable viewers to easily compare how a movie treated the same portion of the book. With the presented information, an aspect of the invention presents options to the user to purchase the content (via a one-click feature or the shopping cart model), purchase similar content such as the entire Star Wars Series as a package, browse, continue watching/reading the media content from that point on, and other options.

Figure 3:
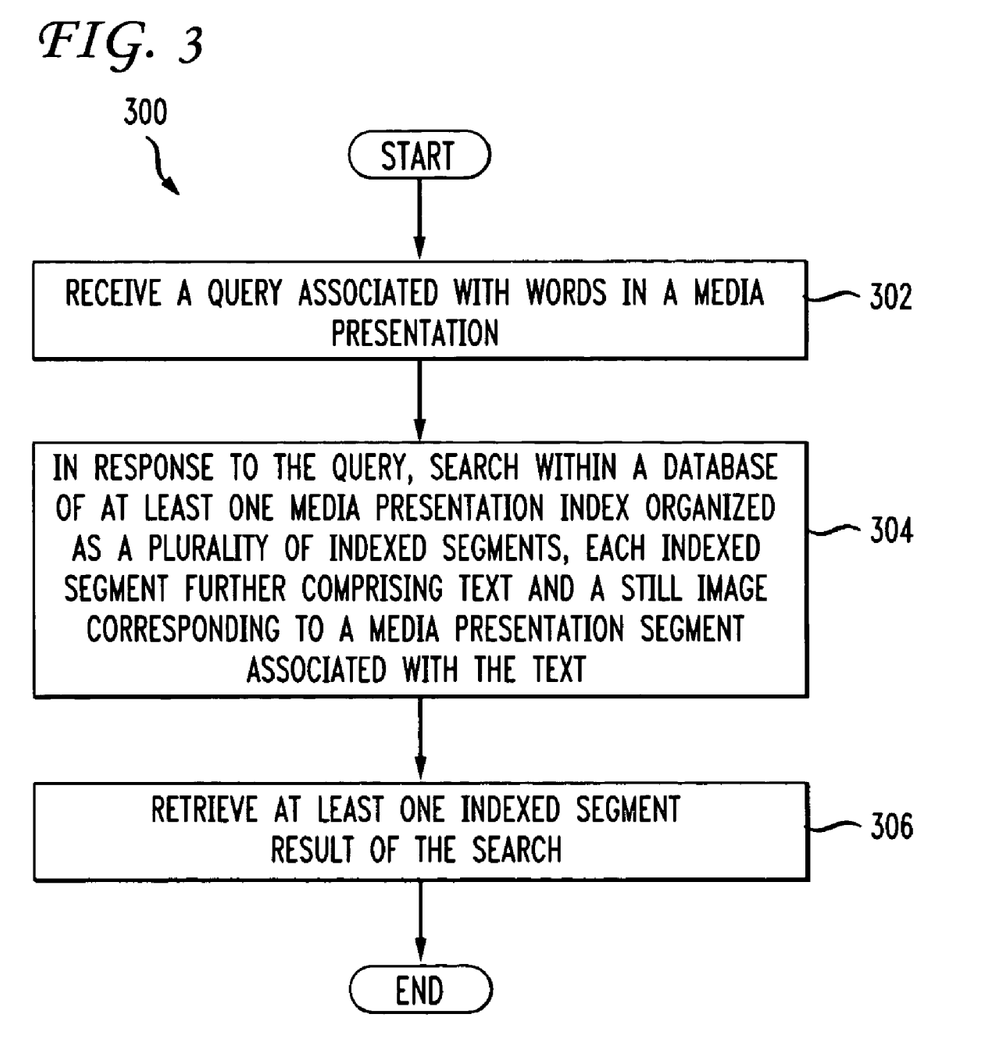
FIG. 3 illustrates the method flow diagram.

An exemplary method embodiment of the invention is illustrated in FIG. 3. The method provides information that is valuable for analysis of a media presentation in addition to mere search and retrieval. The method comprises receiving a query associated with words in a media presentation 302. The query is preferably received as a text query such as "I am your father" entered into a search field by a person. Other queries may be received via multimodal inputs as well. It is generally understood, however, that the query will be focused on words spoken in a movie, or words sung in a song either in an audio media presentation or as part of a video presentation, words in a book or other text-based media, words in a television show etc. In response to the query, a computing device searches within a database of at least one media presentation index organized as a plurality of content-based indexed segments, each indexed segment further comprising text and a still image corresponding to a media presentation segment associated with the text 304. The computing device retrieves at least one segment or a plurality of indexed segments as a result of the search 306 and also retrieves a word-based analysis of the media presentation (308). An example of the word-based analysis tool is discussed below with referenced to FIGS. 7A and 7B. The analysis may also be based on other content in the media besides words, such as sounds, scenes, actors, backgrounds, background music, battles, etc.

A content-based indexed segment may comprise any non-linear organization of the media. For example, rather than moving forward or backward page by page, chapter by chapter or frame by frame, an indexed segment may comprise an organization of the media according to a type of experience. Indexed segments may be organized in a dialog-based fashion or based on any number of criteria. Examples include, dialog turn by dialog turn, conversation by conversation, battle by battle, game by game (such as basketball games in the movie Hoosiers), subtitle by subtitle, advertisement by advertisement (such as in a newspaper or magazine), actor by actor (such as each scene or page featuring Darth Vader) and so forth. In this manner, the indexed segments are based on the content of the media rather than just frame by frame or page by page (i.e., linearly).

Figure 4A:
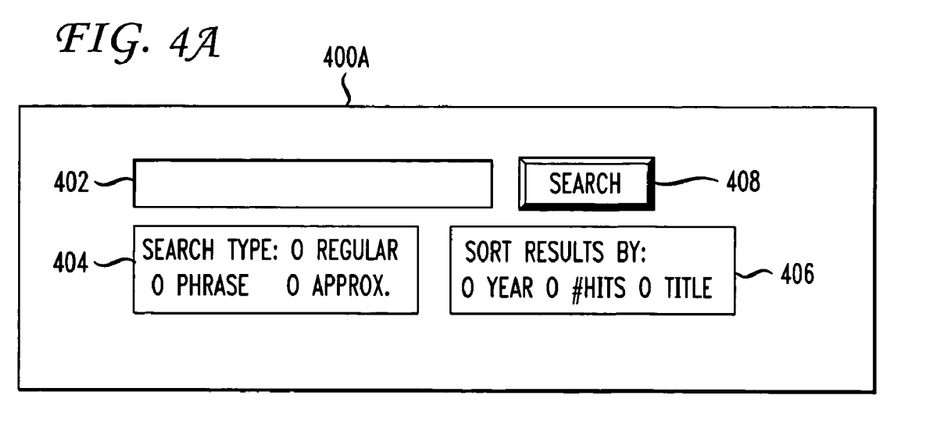
FIG. 4A illustrates an exemplary graphical user interface search view.
Figure 4B:
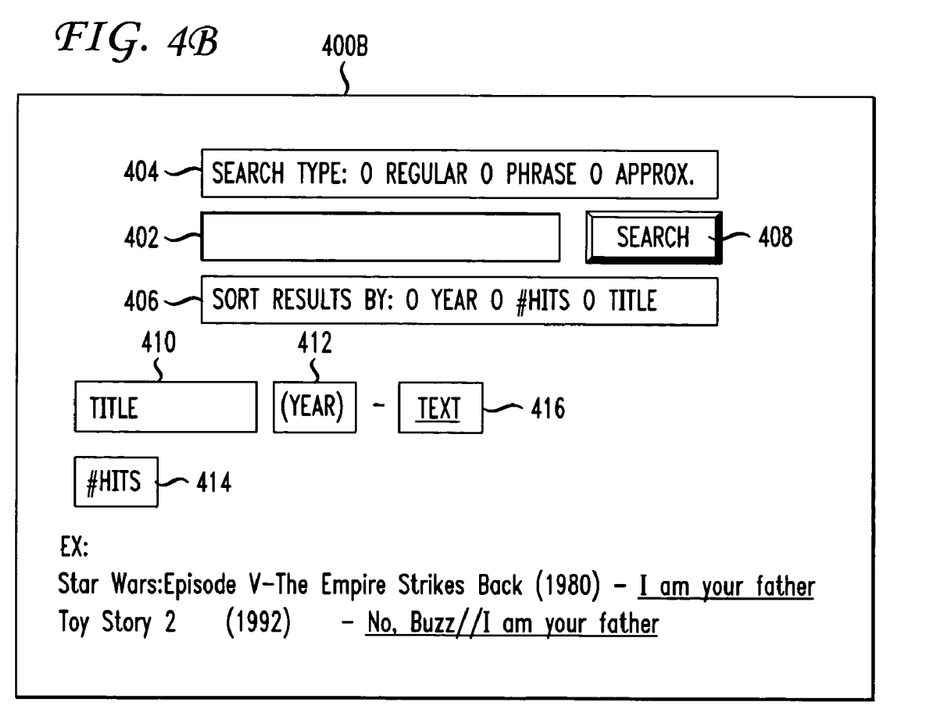
FIG. 4B illustrates an exemplary user interface list view.
Figure 4C:
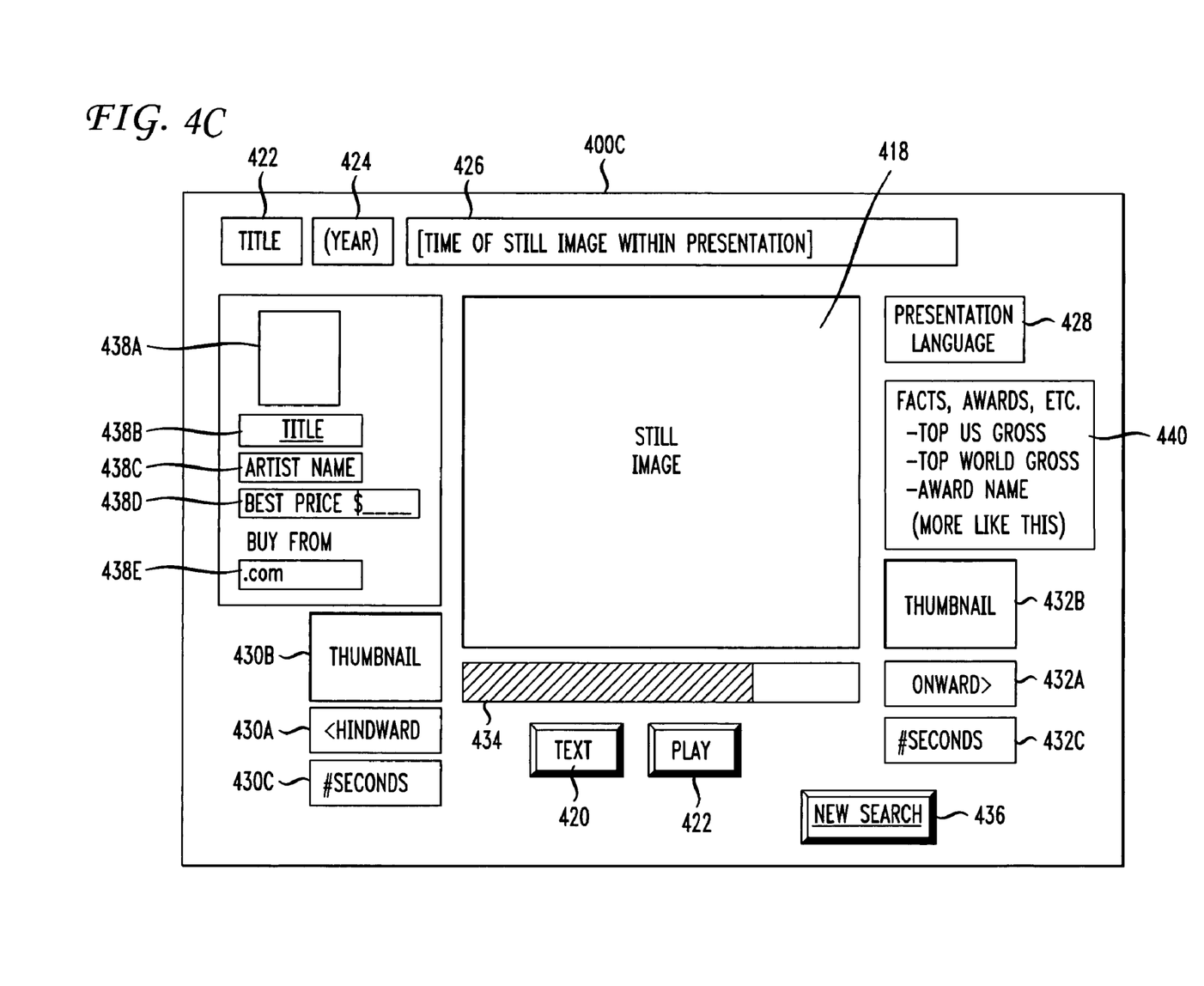
FIG. 4C illustrates an exemplary user interface browser view.

Three user views of exemplary graphical user interface (GUI) 400 are illustrated by FIG. 4A, FIG. 4B, and FIG. 4C. A user wishing to utilize the invention may begin his or her search for media presentations and segments of media presentations in search view 400A as shown in FIG. 4A. This view function as a simple input and control form for the user and may contain a query input field 402, "SEARCH TYPE" indicator field 404, "SORT RESULTS BY:" indicator field 406, and "SEARCH" button 408.

In field 402, the user may type, or by any other computer-interpretable means, input a piece of text for which to search in the contents of the database. The user may specify how to control the search using field 404 to select a regular, phrase, or approximation search. Other variations on the type of search are contemplated as well. Results displayed in list view 400B will be sorted by the criterion specified in field 406, such as: year, number of hits, title of media presentation. It is possible that other such criteria may be used to control how query results are displayed. The search is executed when button 408 is clicked or otherwise initiated.

Using search view 400A, the user may input a piece of text for which to search in the contents of the database, specify how to control the search, specify the criteria by which results will be sorted when displayed, and initiate the search. These capabilities are also available in view 400B, via a duplicate set of the same fields and button.

The list view 400B, as illustrated in FIG. 4B, displays the results of the search initiated in view 400A, or initiated by the duplicate fields and button appearing in view 400B. The fields and button from view 400A duplicated in view 400B include field 402, field 404, field 406, and button 408. The additional fields found in view 400B are fields in a list showing the results of the search, which include a "TITLE" field 410, "YEAR" field 412, "# HITS" field 414, and text field 416. Field 410 displays the tide of a media presentation. Field 412 displays the year in which the media presentation was released. Information useful in identifying a film in addition to title and year of release are contemplated as well. Field 414 displays the number of indexed segments from a given media presentation in which the queried text appears if there is more than one such segment, otherwise, Field 414 does not appear. Field 416 shows all of the text from a given indexed segment which can fit into one line of the space available in the list, but which may not actually contain all of the text from a given indexed segment. Each text string in Field 416 contains a hypertext link to an indexed segment.

As mentioned above, the retrieved listing of matching media may be one media type, such as movies, or may be a blending of media types such as movies, books, television programs, and so forth. The blending of media types, especially if presented in a chronological order, could enable the user to study the use of a given phrase from the first use in a movie or book through other media and thus through the culture of society. When one of the listings as a result of the search is selected by the user, the system presents, as an example, the view 400C shown in FIG. 4C.

View 400B may be used to input a piece of text for which to search in the contents of the database, specify how to control the search, specify the criteria by which results will be sorted when displayed, initiate the search, display the tide and release year of each media presentation which contains at least one indexed segment corresponding to the query, display a text string from each indexed segment corresponding to the query, and permit selection of an indexed segment to be displayed in its entirety in view 400C.

The browser view illustrated in FIG. 4C is an exemplary user interface in which indexed segments can be viewed in the context of the media presentation from which they are derived. This view also contains additional links to information regarding the media presentation associated with the indexed segment and the presented data. Some of the fields in FIG. 4 are used to display the contents of an indexed segment selected by the user. These include a still image 418 and corresponding text field 420 (which may include the searched text as it is used in the presentation such as "Luke, I am your father"), a title field 422 which preferably presents the tide of the media presentation, a year field 424 preferably stating the year of publication associated with the presentation, a text field displaying the portion of the presentation to which the indexed segment corresponds 426 (such as, for example, "approximately one minute into chapter 23"), and a presentation language field 428. These fields allow the user to view the whole image and text of an indexed segment, the tide and release year of the corresponding media presentation, the point in the presentation from which the contents of the segment are drawn, and the language of the presentation.

In a printed media example or a text-based media example, the still image 418 may comprise a page of the media presentation. If the database comprises indexed segments associated with books, and the search "Luke, I am your father" returned the page of one or more books containing that text, then the still image may provide the sentence, paragraph or page (or sentences, paragraphs or pages) that contain that text. In this manner, the page and perhaps previous and future pages of the text-based presentation can be shown as still images to the user so that the user can obtain an understanding of the context of the searched words. The previous and future pages are preferably organized within the indexed segments such that the user can navigate forward or backward through the media according to the indexed segments and not just page by page. The user can then review previous pages and following pages to obtain more information about the book and the information contained therein. Options to purchase the text-based media presentation or other groupings or related media may of course be marketed as well to the user. In this regard, copyright issues are also addressed where the entire text-based media is not presented to the user.

Once the retrieved segment or still image is provided to the user, the user may search forward or backward through the text or video media in a more intelligent manner. For example, the indexed segments may be organized in any fashion such as next person speaking, next conversation, next scene, next car chase, next battle, etc. The user may be presented with various options to search according to one of these different criteria or a combination of criteria (skip to the next battle between Luke Skywalker and Darth Vader). In this regard, once a frame is presented or a page from a book is presented that relates to a search query, the skipping forward and backward through the media may be performed via the indexed segments or a combination of parameters associated with the indexed segments rather than unintelligently just to the next page or the next frame. Therefore, retrieving a plurality of indexed segments as a result of the search enables a user to navigate forward to at least one following indexed segment and backward to at least one previous indexed segment from the indexed segment associated with the query.

An example of this in a book would be where the book may be indexed according to conversations. The indexed segments would each relate to a conversion and as the user views the page associated with the query text, the user can skip forward to the next conversation (as opposed to just skipping to the next page) or to the previous conversation (as opposed to skipping to the previous page). The indexing can be according to any parameter. The user may further search forward or backward through retrieved segments by combining criterion. For example, the user may desire to skip forward to the next segment where a fight between two generals occurs.

Other fields in FIG. 4C are used to allow continued navigation within view 400C and to other views in the GUI. These include: a previous segment button 430A and a corresponding thumbnail image of the previous segment 430B as well as a number of seconds before the current segment field 430C; a next segment button 432A and a corresponding thumbnail image of the next segment 432B as well as a number of seconds after the current segment field 432C; a graphical representation of the point in the presentation to which the segment refers 434; and a "NEW SEARCH" button 436.

Selecting either 430A or 430B loads the indexed segment which immediately precedes the current segment. Similarly, selecting either 432A or 432B loads the indexed segment which immediately follows current view segment. Field 430C indicates how many seconds prior to the current segment the previous segment occurs in the media presentation while Field 432C indicates how many seconds after the current segment the next segment occurs in the media presentation. Field 434 graphically indicates the point in the presentation to which the segment refers.

Still other fields in FIG. 4C provide links to help find related offers and information relating to the media presentation. Some of the links suited to a commercial application of the invention may include, among others: a thumbnail image of the cover of the media presentation 438A and corresponding title field 438B, an artist name field 438C, a "BEST PRICE" field 438D, a "BUY FROM" button 438E. Here the user may be presented with a "one-click" purchasing option from an outlet such as Amazon.com. A list of awards and honors such as field 440 may also be useful in presenting additional information about the media presentation to the user. In a web-based application of the invention, such fields may contain links to various external websites including retailers, content channels, and reference sources.

The information obtained from the database of indexed segments will include marketing information useful for advertisements or means of purchasing the media presentation or accessory products and services associated with the presented index segment. For example, all the information associated with the selection of the media presentation may be used to target marketing to the user in the presentation view of the indexed segment. The user may be presented with an option to purchase all the movies that use the phrase "I am your father" including Star Wars, Toy Story II, and Spaceballs. Therefore, the marketing aspect of the invention comprises receiving information associated with a media presentation search, generating an advertisement for a product and/or service in response to the received information, and presenting a marketed advertisement to a searcher. The user may be presented with a plurality of marketing options, such as, for example, to purchase the media presentation (e.g., movie) or to purchase the media presentation as part of series (e.g., the Star Wars Trilogy).

Other non-commercial applications of the invention, such as for use in an archival or library setting may also find the integrated linking structure useful for launching related applications or accessing additional information. The database of indexed segments that is searchable may also be utilized for analysis of the structure of content whether it be video, audio or text. For example tracking phrases from an original use of a phrase through later presentations to mimic, parody or copy the words or phrase. Multilingual studies of movies can easily be done using the database and principles of the invention.

While the media presentations applicable to the present invention include movies, books, videos, audio and other types of media, the preferred embodiment of the invention utilizes the searching of movies. Most movies are subtitled to enable different languages to be used and for the hearing impaired. Where the media to be searched is one or more movies, an aspect of the invention relates to preprocessing the movie to create a database of indexed segments that is searchable as described herein.

Figure 5:
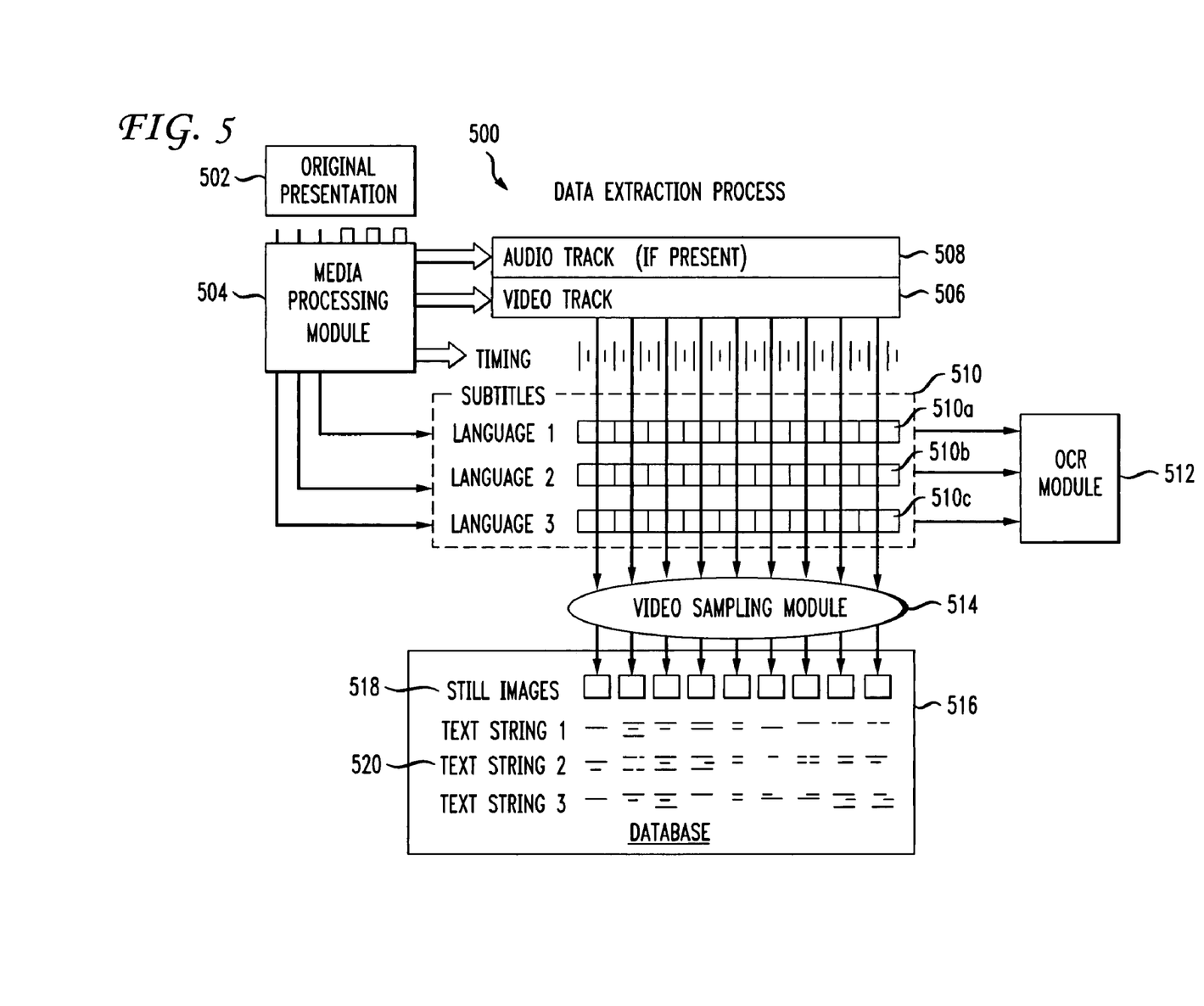
FIG. 5 illustrates the data extraction process for a motion picture.

A movie stored on DVD or other medium is processed by extracting subtitles from the movie. This processing comprises time indexing subtitles with their time codes and generating screen shots from the appropriate moments in the presentation. This process is illustrated in FIG. 5. The data extraction process 500 starts with content from the original presentation 502, separating the original presentation into distinct tracks by means of a media processing module 504. The various channels or tracks of information which may be included in the original presentation as illustrated are a video track 506, audio track 508, and subtitle tracks 510a, 510b, and 510c. In this illustration, each of the subtitle tracks may represent an alternate written language. These tracks may be interpreted or sampled by an optical character recognition (OCR) module 512, and/or a video sampling module 514. Information obtained by these modules may be collected and combined using timing information to produce a media presentation index comprising still images 518 and text strings 520 stored in a database 516.

The text strings 520 may be in different languages such that a user may search through the movie content using different languages. As can be appreciated, with the indexed segments organized such that each segment includes a portion of text and an associated image from the video portion, it is an easy process to switch between languages within each indexed segment or as a whole to enable multi-lingual searching. This also enables an improved teaching tool to see how different languages treat the same video content.

Using subtitles also enables a user to search on other things rather than exactly what was said. Some television programs or other video content may utilize subtitles to describe other sounds such as "dog barking". Where these words are used as a subtitle, the user can also search for any sound that is mentioned in the subtitle. An alternate approach to this may also include using synonyms or a search that broadens beyond the particular words to match non-spoken sounds. For example, the user may type "yelping puppy" which may be searched in a broader context and return the indexed segment associated with the "dog barking."

Figure 6:
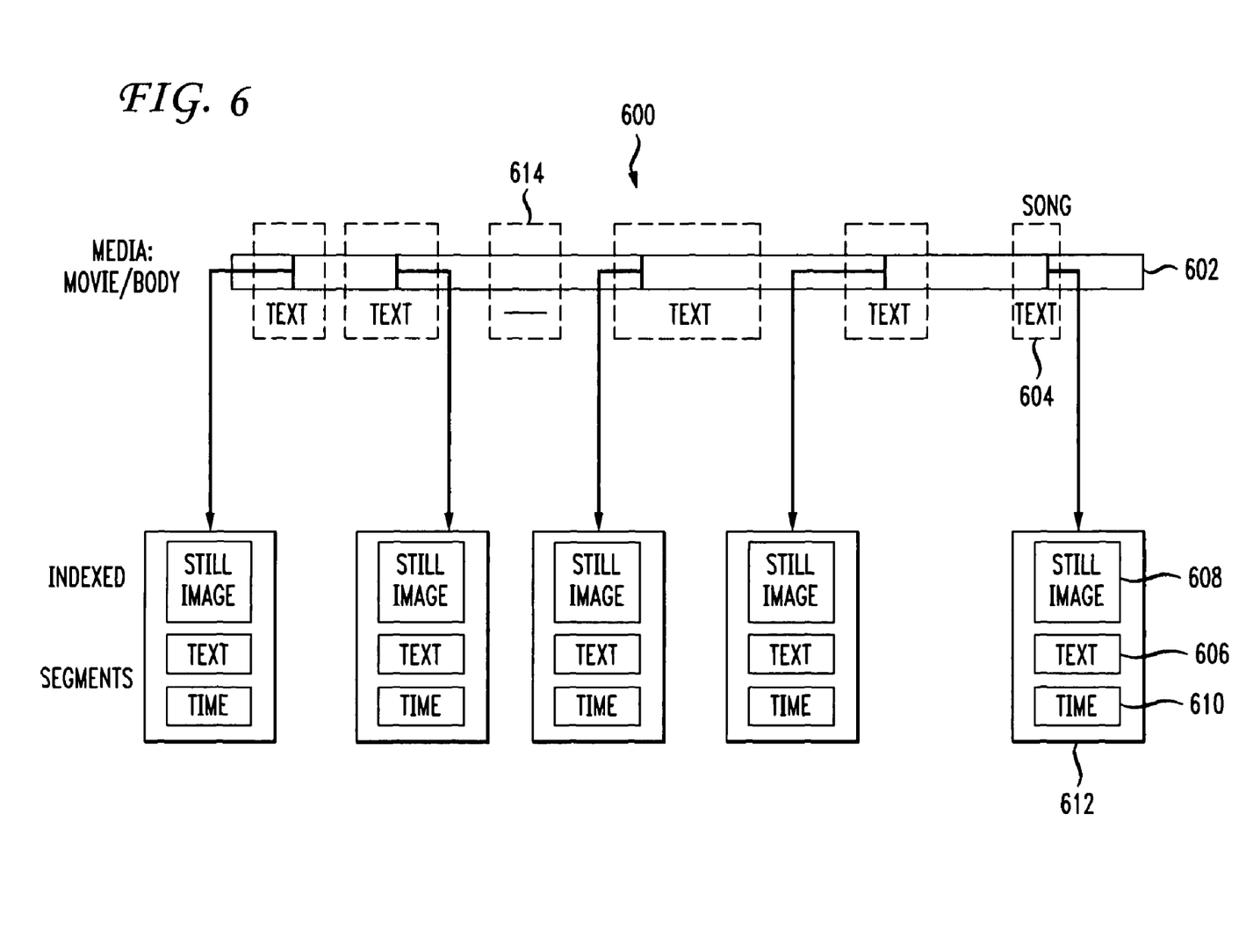
FIG. 6 illustrates the composition of indexed segments for a motion picture.

FIG. 6 provides a visual representation of indexed segments 612 derived from a movie 602. The fundamental unit of movie content from which each indexed segment is derived is a subtitle 604. Associated with each subtitle 604 is a portion of the movie 606, a still image 608 extracted from within that portion of the movie, and a time stamp 610 referring to a point of time in the movie corresponding to the subtitle 604 and still image 608. The indexed segment 612 preferably comprises the still image 608 associated with the media portion 606, the text 604 associated with the portion 606 and may include optionally a time stamp 610 and other information associated with the portion.

Therefore, the database of indexed segments represents a condensed version of the media content. This facilities communication via lower bandwidth applications such as over a wireless network to portable computing devices. The preprocessing preferably includes an automated system which can receive the media content and process the content to generate the flattened, condensed database of indexed segments. The steps of this process may include, in the context of movies, extracting subtitles from media content such as a DVD, time indexing the subtitles with movie time codes and generating a screenshot from an appropriate moment in the portion associated with the subtitle. These steps are repeated for every subtitle language associated with the content. The resulting database includes a constructed text index over the media presentation wherein a search facility may be implemented over the index using a web-based browser. Media content different from movies is preprocessed in a similar manner. One component of each indexed segment is the timing element wherein the text of what was said (or sung or printed) is tracked and associated with the appropriate indexed segment.

Another benefit of the generated database according to the invention is the ability to enable more complex queries and comparisons of media presentations to increase the ability of people to research media content and culture.

As can be appreciated in FIG. 6, not each movie portion may have an associated indexed segment. For example, the movie "Cast Away" has a large portion of the movie where no talking occurs. Portion 614 does not have any subtitle text associated with that portion of the movie and thus in one aspect of the invention, this portion of the movie, when being preprocessed, will produce no indexed segments.

The indexed segments may also include other information about each portion 606. For example, the music being played in the background (composer, orchestra, soloist, or other of information), the name of the actor or the character speaking the subtitle lines, etc. The indexed segment may be associated with any type of information for that particular segment that may be useful for the user to understand when the indexed segment is presented to the user for viewing, purchasing, watching, etc.

As can be seen in FIG. 5 and FIG. 6, when applied to movies, the invention results in a flattened representation of a movie and its content, analogous perhaps to a first order approximation in mathematics. This representation of a movie may assist in preserving a meaningful presentation of content, without displaying the original presentation itself. The invention may thus improve the archival capabilities of organizations such as the Library of Congress or other content industry reference groups. In commercial applications, by allowing customers access to an index or database of indexed movie segments as described herein, content providers and merchandisers could allow searchable access to content while maintaining the rights of copyright owners. These ways might include via digital cable, satellite, or broadband internet transmission, or a storage medium such as DVD.

There are also various ways in the context of printed media to make use of this particular advantage of the invention. Depending on how content from printed media is organized in a database, the legal owner of that content can control the level of access permitted to users. This may include arranging content from published texts as units such as, sentences, paragraphs, articles, pages, chapters, or volumes. This is just one way of using the invention to arrange content in a manner consistent with the legal owner of the printed media from which that content is derived.

In the context of books and printed materials, FIG. 6 is also applicable. Suppose the media 602 is a book or printed document, such as the book entitled "Star Wars." The portion 606 in this case may represent the page or pages upon which the phrase "I am your father" is found. The "still image" component of that portion 606 may comprise the sentence or paragraph 608 containing the text 604. Therefore, the indexed segment in the context of a book may be a reduced amount of text representing the still image 608 that is presented to the user, along with the search text 604 and other information 610. Just as in the video context, this enables the user to get an understanding of the media presentation that is returned as a result of the search without enabling access to the entire presentation. Options to purchase or skip forward or backward through indexed segments as shown in FIG. 4C can also be available.

The organization of the indexed segment also applies to the other possible media such as songs. In this case, returning to FIG. 6, the song 602 may have portions 606 with an associated still image 608. The still image 608 may simply be the song album cover, an image from a music video, or some other image that the artist may select. When a user is searching songs, the text 604 will be returned with an image 608 and will include the various kinds of information to enable the user to learn more about the song, purchase the song, and so forth as is shown in FIG. 4C.

The invention may apply to any medium from which a still-image and text index may be constructed. While subtitles are frequently found in motion pictures, any presentation that has words may be indexed. The result is a highly structured set of still images, with corresponding text, and other relevant information. This representation of content from a media presentation is significantly different from the original presentation itself. The method also comprises providing a linking structure, allowing the user to find additional relevant information which may include sources from which to purchase the desired media presentation in its complete, original form.

The present invention allows indexing, searching and referencing for content that contains words. It is conceivable that the invention may be utilized to promote sales, for research, for archiving various media, and for other purposes. Appropriate new data storage methods allow indexing, searching, and references to content. The present invention may be applicable to media such as books, songs, and other media which contain words, providing for a thorough source of reference for content producers, researchers, archivists, retailers and consumers.

An example application of the principles of the invention may include providing a searching software module with digital video disk (DVD) or audio content. The feature represents another embodiment of the invention. For example, with each presentation, the user may have the ability to search within the DVD, CD or other computer-readable media, for a particular line. In this case, the modifications to the presentation of the search results will not typically include a listing of the media presentations that include the text because the software is associated with a single movie. Here, the module takes the user to the indexed segment of the media presentation on the computer-readable medium and enables the user to play, select forward, backward, or to view/listen from that point on. The play button 442 is shown in FIG. 4C and represents the typical controls used for controlling a movie or other media presentation.

In this regard, the invention for searching within a single media presentation such as a movie on a DVD or an album or CD of songs may comprise presenting on the computer readable medium the media content itself as well as a database of indexed segments. In the movie context, the user can then utilize the searching feature to find a scene that contains the text. The indexed database with its time-stamp information is then linked to the chapter or specific moment in time within the movie itself. When the user is viewing the screen in FIG. 4C, the user sees the still image and text associated with an indexed segment. If the user then desires to watch the movie from that point on, the user can then click the play button 442 to view that indexed segment going forward. In this context, the user may then have access to the standard controls of the media presentation such as play, fast forward, rewind, chapter skip and search and so forth. The invention in this respect provides for a search mechanism that then links the user to a particular place within a movie. The previous method of DVD movie searching is either simply fast forward (at various speeds) or a chapter search, which is not helpful if a person desires to go to a certain phrase within the movie. The condensed nature of the database makes it possible to store the indexed segment database on the DVD medium itself in addition to the media content. It is contemplated that any computer-readable medium may store the media content as well as the indexed segment database with the necessary software modules to enable the indexed segment search and then link to the media presentation itself.

Where a computer-readable medium may store multiple media presentations, such as a DVD of Seinfeld episodes, the indexed segment database may present one or more of the individual media presentations matching a text search and then enable the user to select one of the identified presentations for watching or playing from the identified indexed segment forward (instead of just the still image and text). This embodiment of the invention enables copyright owners to improve the user enjoyment, searching of and access to the copyrighted content.

Figure 7A:
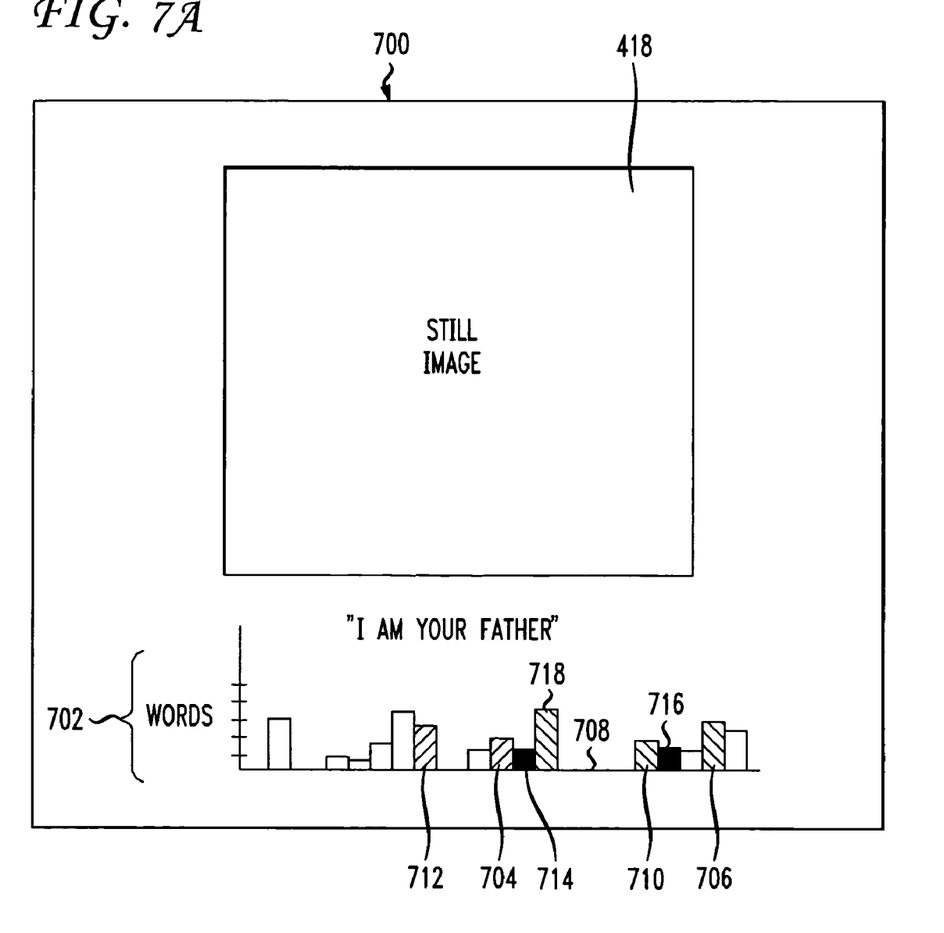
FIG. 7A illustrates a verbosity histogram presented with the retrieved video segment.

FIG. 7A illustrates a window 700 illustrating a feature of the invention which may be referred to as a verbosity histogram 702. A verbosity histogram is an example of a word-based analysis of a media presentation. Window 700 shows a still image 418 presented in response to a search. In some cases, a user may desire to understand some context of the particular phrase. The verbosity histogram assists the user in this regard. Here, an analysis is performed either dynamically or in advance where for each time segment before or after the retrieved segment, a parameter associated with the number of words spoken in that time segment is represented in the histogram. For example, segment 704 refers to the current words "I am your father" and the current time segment, which can be any length such as 10 seconds, 1 minute or any other time period that is suitable or desirable. Thus, a word group having a width and a height that is associated with a group of words is presented. As an example, the words "I am your father" may be represented as word group 704 with a width corresponding to either a fixed time (the 30 second interval that the words are in) or a dynamic time (the time it takes for that phrase to be spoken by the speaker).

For each time period (segment of 1 minute, etc.) in the future, the histogram shows the number of words spoken in that segment. Where no words are spoken 708 nothing is shown. The time length of each segment is preferably represented by its width 710 in the histogram. Other features may be shown such as shading segments according to whether they are spoken by the same speaker. Segments 712 and 704 are shaded the same way as are segments 714 and 716. Segments 706, 710 and 718 are shaded the same was to represent that they are spoken by the same person. The shading may also mean something else such as segments spoken by men, women, children, football players on the same team, etc. Options may be presented to the user as well wherein each segment may have metadata storing information about each segment (such as the speaker is Darth Vader, a characteristic of the speaker such as being evil, wears black, is a father, and so forth) such that the user can select how the histogram represents the information.

Typically the height of the histogram visually shows how many words are spoken in each segment. Other visual images may also be presented by way of shading or coloring to indicate characteristics such as language (all Spanish words are in one color and English words in another), tone, volume, accent, dialect, whether background music is playing, whether the words are sung and so forth. To show some additional presentation, the histogram may appear three dimensional as well. In this regard, as an example, width may reflect the time segment, height may reflect the number of words, and depth may reflect volume, or any other parameter or characteristic of the word group. These parameters may be moved around such that any particular characteristic may be reflected in any dimension of the word grouping. Therefore, the histogram can present the user with basic information or a wealth of information. The X and Y axis of the histogram may also be modified by the user as well. Histograms can visually present to the user how a clump of speech is organized in the video presentation.

Figure 7B:
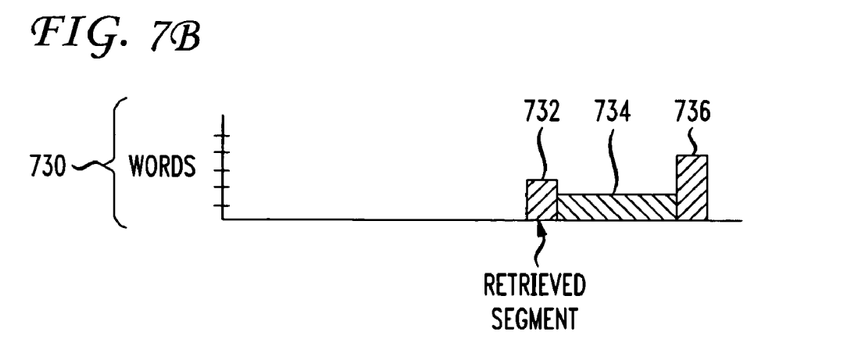
FIG. 7B illustrates another histogram.

FIG. 7B illustrates another feature of the histogram 730. In this illustration, the time length of each segment varies. Segment 732 is shorter than segment 734. In this example, the length of the segment may not be static as in 30 seconds for each segment but may be dynamic or changing based on the content. If one person is giving a 5 minute speech, then the entire speech 734 may be represented in a similar manner as that is shown. The height of the segment in this regard may represent number of words per minute or some other word count-related parameter. Segment 736 may represent a person that speaks faster and thus that segment show a person who said twice as many words per minute but whose comment was shorter in time. The shading of 732 and 736 is also the same which as indicated above may indicate that they were spoken by the same person.

With a processed video presentation, other enhancement features to the histogram are also available. For example, the segments may include faces of the speaker to provide a more meaningful and simplified presentation of the histogram. For example, in FIG. 7A, segments 704 and 710 may have a small face of Darth Vader to easily identify who is speaking. The segments may have the words or initials (DV) to also present who is speaking. These and other features are contemplated to give analysis information to the recipient of the search result.

Where the media presentation that is searched is a book or non-video media, the word-based analysis may also be provided similar to that shown in FIG. 7B. In books, the time length of each segment is not an issue but the length of each segment may be illustrated and the person speaking, or narration, can be shown. Therefore, FIG. 7B, for a book, may illustrate a person speaking as 732, 736 and narration 734. By presenting this type of information, the user can immediately know whether the identified segment of text is within a particular type of text in the book (a long speech, a short line, narration, in a long conversation between two people, and so forth). In another aspect of the invention, a time element could be included in the histogram for a book where, for example, if a reading speed is established, each grouping of words could also be shown to represent time as well.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. As mentioned above, the principles apply to video, audio and text-based presentations. Accordingly, the appended claims and their legal equivalents should only define the invention, rather than any specific examples given.

We claim:

1. A method for searching a text-based media presentation, the method comprising:
   receiving a query associated with words in the text-based media presentation;
   in response to the query, searching within a database organized as a plurality of content-based indexed segments associated with at least one text-based media presentation, each content-based indexed segment comprising text and at least one still image corresponding to an associated portion of the text-based media presentation;
   retrieving a plurality of indexed segments as a result of the search;
   presenting a selected indexed segment from the plurality of retrieved segments by displaying the at least one still image, text corresponding to the selected indexed segment, and a verbosity histogram for the selected segment based on the query, wherein the verbosity histogram is based at least in part on a number of words spoken in a period of time represented in a vertical axis in the verbosity histogram for a plurality of time segments represented in a horizontal axis of the verbosity histogram;

if a user indication of navigating forward is received, then presenting a next indexed segment, displaying the at least one still image and text corresponding to the next indexed segment and skipping at least a next page in the media presentation; and if the user indication indicates navigating backward, then presenting a previous indexed segment, displaying the at least one still image and text corresponding to the next indexed segment and including skipping at least a next previous page in the media presentation.

2. The method of claim 1, wherein the text-based media presentation is one of: a book, a magazine or a newspaper.

3. The method of claim 2, further comprising presenting to a user the indexed segment associated with the query presenting the at least one still image.

4. The method of claim 1, further comprising presenting the user with an option to navigate forward or backward from the indexed segment associated with the query by a plurality of types of indexed segments.

5. The method of claim 2, wherein if the text-based media presentation is printed media, the still image corresponding to the associated portion of the media presentation further comprises one of a phrase, sentence, paragraph or page in which the words appear in the printed media.

6. The method of claim 1, further comprising:
presenting a text string corresponding to text from each of the plurality of indexed segments retrieved as a result of the query.

7. The method of claim 6, further comprising:
identifying and presenting one or more pieces of information associated with each of the plurality of indexed segments retrieved as a result of the search.

8. The method of claim 7, wherein the one or more pieces of information associated with each of the plurality of indexed segments retrieved as a result of the search further comprise information associated with the media presentation.

9. The method of claim 8, wherein the information associated with the media presentation further comprises:
the title of the text-based media presentation from which the indexed segment related to the query is derived;
the year in which the text-based media presentation was first released or published; and
the number of indexed segments corresponding to the query that occur each of the text-based media presentations containing one or more such indexed segments.

10. The method of claim 6, further comprising:
receiving a selection of one of the plurality of indexed segments; and
presenting to a user an indexed segment corresponding to the selection.

11. The method of claim 10, further comprising identifying and presenting one or more pieces of information associated with the indexed segment corresponding to the selection.

12. The method of claim 11, wherein the one or more pieces of information associated with the indexed segment corresponding to the selection further comprises at least one of:
the title of the media presentation from which the indexed segment is derived;
the year in which the text-based media presentation was first released or published;
the language of the text-based media presentation;
the point in the media presentation to which the indexed segment corresponding to the selection corresponds;
the indexed segment immediately preceding the indexed segment corresponding to the selection;
the indexed segment immediately following the indexed segment corresponding to the selection;
the name or names of artists featured in the text-based media presentation;
the name of the author, director, or producer of the text-based media presentation; and
a link to one or more vendors or content providers offering the text-based media presentation to consumers.

13. The method of claim 1, further comprising retrieving information associated with the query and generating a marketing message to a user that submitted the query based on the retrieved information.

14. The method of claim 13, wherein the marketing message further comprises at least two different ways in which the media presentation may be purchased.

15. A system for searching at least one text-based media presentation, the system comprising:
a first module configured to receive a query associated with words in a text-based media presentation;
a second module configured, in response to the query, to search within a database organized as a plurality of content-based indexed segments associated with at least one text-based media presentation, each content-based indexed segment comprising text and a still image corresponding to an associated portion of the text-based media presentation;
a third module configured to retrieve a plurality of indexed segments as a result of the search;
a fourth module configured to present a selected indexed segment from the plurality of retrieved indexed segment by displaying the at lest one still image, text corresponding to the selected indexed segment, and a verbosity histogram for the selected segment based on the query, wherein the verbosity histogram is based at least in part on a number of words spoken in a period of time represented in a vertical axis of the verbosity histogram for a plurality of time segments represented in a horizontal axis of the verbosity histogram;
a fifth module configured, if a user indication of navigating forward is received, to present a next indexed segment, display the at least one still image and text corresponding to the next indexed segment and skip at least a next page in the media presentation; and
a sixth module configured, if the user indication indicates navigating backward, to present a previous indexed segment, display the at least one still image and text corresponding to the next indexed segment and skip at least a next previous page in the media presentation.

16. The system of claim 15, further comprising a seventh module configured to present to the user an option to navigate forward or backward from the indexed segment associated with the query by a plurality of types of indexed segments.

17. The system of claim 15, further comprising:
a seventh module configured to identify and present one or more pieces of information associated with each of the plurality of indexed segments retrieved as a result of the query.

18. A computer-readable medium storing instructions for controlling a computing device to searching at least one text-based media presentation, the instructions comprising:
receiving a query associated with words in a text-based media presentation;

in response to the query, searching within a database organized as a plurality of content-based indexed segments associated with at least one text-based media presentation, each content-based indexed segment comprising text and at least one still image corresponding to an associated portion of the text-based media presentation;

retrieving a plurality of indexed segments as a result of the search;

presenting a selected indexed segment from the plurality of retrieved segments by displaying the at least one still image, text corresponding to the selected indexed segment, and a verbosity histogram for the selected segment based on the query, wherein the verbosity histogram is based at least in part on a number of words spoken in a period of time represented in a vertical axis of the verbosity histogram for a plurality of time segments represented in a horizontal axis of the verbosity histogram;

if a user indication of navigating forward is received, then presenting a next indexed segment, displaying the at least one still image and text corresponding to the next indexed segment, and skipping at least a next page in the media presentation; and if the user indication indicates navigating backward, then presenting a previous indexed segment, displaying the at least one still image and text corresponding to the next indexed segment and skipping at least a next previous page in the media presentation.

19. The computer-readable medium of claim 18, wherein the instructions further comprise presenting to the user an option to navigate forward or backward from the indexed segment associated with the query by a plurality of types of indexed segments.

20. The computer-readable medium of claim 18, the instructions further comprising:

identifying and presenting one or more pieces of information associated with each of the plurality of indexed segments retrieved as a result of the search.

* * * * *